United States Patent
Mickle et al.

(10) Patent No.: US 8,514,056 B2
(45) Date of Patent: Aug. 20, 2013

(54) SYSTEM AND METHOD FOR REAL TIME ASSET LOCATION AND TRACKING

(75) Inventors: Marlin H. Mickle, Pittsburgh, PA (US); Peter J. Hawrylak, Woodstown, NJ (US); Michael A. Rothfuss, Feasterville, PA (US)

(73) Assignee: University of Pittsburgh—Of the Commonwealth System of Higher Education, Pittsburgh, PA (US)

( * ) Notice: Subject to any disclaimer, the term of this patent is extended or adjusted under 35 U.S.C. 154(b) by 909 days.

(21) Appl. No.: 12/563,441

(22) Filed: Sep. 21, 2009

(65) Prior Publication Data

US 2010/0073188 A1    Mar. 25, 2010

Related U.S. Application Data (60) Provisional application No. 61/099,977, filed on Sep. 25, 2008.

(51) Int. Cl.
*G08B 5/22* (2006.01)

(52) U.S. Cl.
USPC .... 340/8.1; 340/10.1; 340/539.13; 340/572.1

(58) Field of Classification Search
USPC ......... 340/8.1, 539.13, 10.1, 572.1; 342/450, 342/463; 455/404.2, 456.1, 456.5
See application file for complete search history.

(56) References Cited

U.S. PATENT DOCUMENTS

| | | | |
|---|---|---|---|
| 5,051,741 A * | 9/1991 | Wesby | 340/8.1 |
| 5,424,727 A | 6/1995 | Shieh | |
| 5,469,180 A | 11/1995 | Wiggenhorn | |
| 6,040,774 A * | 3/2000 | Schepps | 340/572.1 |
| 6,127,799 A | 10/2000 | Krishnan | |
| 6,480,110 B2 | 11/2002 | Lee et al. | |
| 6,552,661 B1 * | 4/2003 | Lastinger et al. | 340/572.1 |
| 6,621,467 B1 | 9/2003 | Marsh | |
| 6,650,227 B1 | 11/2003 | Bradin | |
| 6,697,030 B2 | 2/2004 | Gleener | |
| 7,023,342 B2 | 4/2006 | Corbett et al. | |
| 2002/0149481 A1 * | 10/2002 | Shanks et al. | 340/572.1 |
| 2002/0167417 A1 * | 11/2002 | Welles, II et al. | 340/825.49 |
| 2006/0022800 A1 * | 2/2006 | Krishna et al. | 340/10.2 |
| 2006/0055552 A1 * | 3/2006 | Chung et al. | 340/686.1 |
| 2006/0132302 A1 | 6/2006 | Stilp | |
| 2007/0205873 A1 * | 9/2007 | Mickle et al. | 340/10.33 |

OTHER PUBLICATIONS

Miller, L.E. et al., "RFID-Assisted Indoor Localization and Communication for First Responders", National Institute of Standards and Technology (NIST).

\* cited by examiner

*Primary Examiner* — Edwin Holloway, III (74) *Attorney, Agent, or Firm* — Eckert Seamans Cherin & Mellott, LLC; Philip E. Levy (57) ABSTRACT

A system for estimating the current position of an asset within a location that includes a transponder associated with the asset, a plurality of wireless interface devices provided within the location, and a central computer system in electronic communication with the wireless interface devices. The central computer system is adapted to: (i) identify a particular one or more of the wireless interface devices that have received a wireless signal from the transponder, and (ii) determine an estimate of the current position based on the identified particular one or more of the wireless interface devices.

15 Claims, 5 Drawing Sheets

SYSTEM AND METHOD FOR REAL TIME ASSET LOCATION AND TRACKING

CROSS-REFERENCE TO RELATED APPLICATION

This application claims priority under 35 U.S.C. §119(e) from U.S. Provisional Application No. 61/099,977, entitled "System and Method for Real Time Asset Location and Tracking," which was filed on Sep. 25, 2008, the disclosure of which is incorporated herein by reference.

FIELD OF THE INVENTION

The present invention relates to transponder systems, and in particular to a system and method for locating and tracking assets in real time using wireless transponders, such as RFID transponders.

BACKGROUND OF THE INVENTION

The use of radio frequency identification (RFID) systems is expanding rapidly in a wide range of application areas. RFID systems consist of a number of radio frequency tags or transponders (RFID tags) and one or more radio frequency readers or interrogators (RFID readers). The RFID tags include one or more integrated circuit (IC) chips, such as a complementary metal oxide semiconductor (CMOS) chip, and an antenna connected thereto for allowing the RFID tag to communicate with an RFID reader over an air interface by way of RF signals. In a typical RFID system, one or more RFID readers query the RFID tags for information stored on them, which can be, for example, identification numbers, user written data, or sensed data. RFID systems have thus been applied in many application areas to track, monitor, and manage items as they move between physical locations.

RFID tags can generally be categorized as either passive tags or active tags. Passive RFID tags do not have an internal power supply. Instead, the relatively small electrical current induced in the antenna of a passive RFID tag by the incoming RF signal from the RID reader provides enough power for the IC chip or chips in the tag to power up and transmit a response. Most passive RFID tags generate signals by backscattering the carrier signal sent from the RFID reader. Thus, the antenna of a passive RFID tag has to be designed to both collect power from the incoming RF signal and transmit (or reflect, e.g., backscatter) the outbound backscatter signal. Due to power limitations, the ability to provide devices such as sensors or microprocessors on passive RFID tags is limited. Passive RFID tags do, however, have the advantage of a near unlimited lifetime as they obtain their power from the RF signal sent from the RFID reader.

Active RFID tags, on the other hand, have their own internal power source, such as, without limitation, a battery, a fuel cell or what is commonly known as a super capacitor. The internal power source is used to power the IC chip or chips and discrete circuit elements, which typically include an RF receiver, an RF transmitter, and some type of controller, such as microcontroller or other processor, and any other electronics provided on the active RFID tag. As a result, active RFID tags can include relatively high power devices such as sensors, microprocessors, receivers and transmitters. Also, because of the on-board power, active RFID tags typically have longer ranges and larger memories than passive RFID tags. The internal power source, however, also means that active RFID tags typically have a lifetime that is limited by the lifetime of the power source. Thus, periodic maintenance is required.

As noted above, multiple RFID tags may be used to track, monitor, and manage multiple items/assets as they move between physical locations. In such an application, each active RFID tag is affixed to an item/asset that is located in a particular location or environment, such as in a building. The term "building" as used herein shall refer to any structure including, without limitation, a warehouse, a hospital, an office building, or even a vehicle. In current active RFID systems, the active RFID tags, when deployed in such a manner, are done so in a state where (i) an RF receiver of the tag is in an active state for receiving RF signals, and (ii) the controller is in a low power inactive (sleep) state to preserve power. When one or more of the active RFID tags are to be queried, the RFID reader sends out a wake-up signal that is received by the RF receiver of each tag. Upon receipt of the signal, the RF receiver in each tag will then send a signal to the controller of the tag that causes it to move from the inactive state to an active (wake-up) state. For example, in RFID systems implemented according to the ISO 18000 Part 7 standard, when one or more tags are to be queried, the reader will send out a 30 KHz tone lasting for a period of approximately 2.5 seconds. Upon receipt of the tone, the RF receiver in each tag will wake-up the controller in the tag. The RFID reader then sends out signals intended for particular ones of the tags. Those particular tags for which the signals are intended will then perform the requested action, and the remaining tags (i.e., those tags not currently of interest to the reader) will move back to a sleep state. In such systems, tags may also be on continuously not requiring a wake-up signal.

The multiple active RFID tag arrangement just described presents at least two power management problems. First, each active RFID tag that is deployed is required to have at least one component, i.e., an RF receiver, in an active, relatively high power consuming state at all times so that it can listen for the wake-up signal (if employed). Second, when the RFID reader needs to query one or more particular tags, all of the tags that are deployed are woken up (for example, according to the ISO 18000, Part 7 standard), i.e., their controllers are caused to move to an active, relatively high power consuming state. Only when a particular tag determines that the query in question is not intended for it will it then move back to the sleep state. As will be appreciated, these problems result in unnecessary use of power from the power source (e.g., battery) of each tag, and therefore decrease the lifetime of each tag.

United States Patent Application Publication No. 2007/0205873 (referred to herein as the "'873 publication"), owned by the assignee hereof and entitled "Methods and Apparatus for Switching a Transponder to an Active State, and Asset Management Systems Employing Same," is incorporated herein by reference and discloses a number of transponder apparatus embodiments that overcome at least two problems associated with (1) current active RFID tags, and (2) current active RFID tag wake-up protocols. The first problem, as noted above, is that in current RFID tags, an active RF receiving element must always be awake to anticipate a wake-up signal for the balance of the tag electronics. The '873 publication discloses a passive circuit to eliminate the need for an "always on" active RF receiving element to anticipate a wake-up signal for the balance of the tag electronics. This solution allows the entire active RFID tag to have all circuit elements in a sleep (standby) state, thus drastically extending battery life or other charge storage device life and thus essentially eliminating shelf maintenance on the active RFID tag. The second problem, as also noted above, is that in current active RFID tag systems, the electronics of all of the RFID tags in a system are awakened in response to wake-up signals even if the signal is not intended for a particular tag or tags. The solution disclosed in the '873 publication provides a major energy saving circuit that eliminates the need to wake up all of the RFID tags in response to each wake-up signal. This circuit thus reduces total energy consumption of an active RFID tag system or collection of devices by allowing all non-addressed tags to remain in a sleep (standby) state, thereby reducing total system or collection energy. This second circuit can be used in conjunction with the first passive circuit mentioned above or in conjunction with any existing active RFID tag systems.

Furthermore, the numerous advances in wireless RF devices have made possible the determination of location of a transmitting or reflecting RF device in such a way as to make it possible to determine its geographic location. One such methodology is the Global Positioning System (GPS). However, GPS does not work satisfactorily inside of buildings. Other methodologies have been proposed that use the strength of the signal of the device transmission or reflection to provide measurement inputs which are then processed to produce an estimate of device position (e.g., systems that employ a single collection point and Received Signal Strength Indicator (RSSI) signals used to calculate a distance from an RF source). The problem with RSSI based systems is that environmental factors may have an adverse effect on the required distance calculations (which are usually based on the Friis equation).

The '873 publication discloses a novel system for tracking a plurality of assets that employs a plurality of transponders as described above, wherein each of the transponders is associated with a respective one of the assets and stores an identifier identifying the particular asset with which it is associated. The system includes a central computer system that maintains a plurality of records relating to the assets. When properly interrogated by an RF signal that is generated at the direction of the central computer system, each of the transponders generates and transmits a response signal including the identifier identifying the particular asset with which the transponder is associated. The system further includes a network with which the central computer system may communicate, a plurality of wireless access points in electronic communication with the network, and a plurality of interface devices. Each of the interface devices is adapted to (i) wirelessly communicate with at least one of the wireless access points, (ii) receive the response signal transmitted by a particular one or more of the transponders, and (iii) generate and transmit to the wireless access points at least one second response signal that includes each identifier that was included in each response signal received by the interface device. Each second response signal is transmitted to the central computer system through the network, which then uses the received second response signals to update one or more of the records. In particular, the assets are located within an environment such as one or more buildings, and each of the interface devices is associated with a particular location within the environment. In addition, each of the second response signals includes an identification of the interface device from which it was transmitted, and the central computer system uses the identification included in each second response signal to update in the records a location of one or more of the assets. While the system for tracking assets described in the '873 publication is highly effective, there is room for further improvement in the area of asset location measurement and tracking.

SUMMARY OF THE INVENTION

In one embodiment, the invention provides a method of estimating the current position of a transponder associated with an asset within a location that includes steps of providing a plurality of wireless interface devices within the location, identifying a particular one or more of the wireless interface devices that have at least received a wireless signal from the transponder, and determining an estimate of the current position based on the identified particular one or more of the wireless interface devices. The identifying may include identifying a particular one or more of said wireless interface devices that have received and recognized as valid a wireless signal from said transponder. Also, the identifying and determining steps may include: (i) determining a min-term for the transponder, the min-term representing a plurality of Boolean variable values, each of the Boolean variable values being associated with a respective one of the wireless interface devices and indicating whether the one of the wireless interface devices has received and/or received and recognized as valid a wireless signal from the transponder, and (ii) determining the estimate of the current position based on the min-term. Also, the min-term may be one of a plurality of possible min-terms, wherein the method further includes associating each of the possible min-terms with a respective particular position estimate in a look-up table, and wherein the determining the estimate of the current position based on the min-term includes consulting the look-up table using the min-term. The method may also further include causing the wireless interface devices to generate a plurality of wireless interrogation signals, wherein the wireless signal from the transponder is generated in response to receipt of at least one of the wireless interrogation signals. Alternatively, the wireless signal from the transponder may be generated continuously.

In one particular embodiment, the step of determining the min-term for the transponder includes selectively adjusting the wireless receiving sensitivity of the wireless interface devices. This may include selectively adjusting the wireless receiving sensitivity of the wireless interface devices to a plurality of levels, determining a particular min-term at each of the levels, and establishing as the min-term the particular min-term determined at a lowest one of the levels.

In another embodiment, the invention provides a system for estimating the current position of an asset within a location that includes a transponder associated with the asset, a plurality of wireless interface devices provided within the location, and a central computer system in electronic communication with the wireless interface devices. The central computer system is adapted to: (i) identify a particular one or more of the wireless interface devices that have at least received a wireless signal from the transponder, and (ii) determine an estimate of the current position based on the identified particular one or more of the wireless interface devices. The identifying may also include identifying a particular one or more of the wireless interface devices that have received and recognized as valid the wireless signal from said transponder. In addition, the central computer system may be adapted to perform the identifying and determining by: (i) determining a min-term for the transponder, the min-term representing a plurality of Boolean variable values, each of the Boolean variable values being associated with a respective one of the wireless interface devices and indicating whether the one of the wireless interface devices has received and/or received and recognized as valid a wireless signal from the transponder, and (ii) determining the estimate of the current position based on the min-term. Also, the min-term may be one of a plurality of possible min-terms, wherein the central computer system stores a look-up table that associates each of the possible min-terms with a respective particular position estimate, and wherein the central computer system is adapted to determine the estimate of the current position based on the min-term by consulting the look-up table using the min-term.

In one particular embodiment, the wireless interface devices has a selectively adjustable wireless receiving sensitivity, and the central computer system is further adapted to determine a min-term for the transponder by performing steps including selectively adjusting the wireless receiving sensitivity of the wireless interface devices. This may be done by selectively adjusting the wireless receiving sensitivity of the wireless interface devices to a plurality of levels, determining a particular min-term at each of the levels, and establishing as the min-term the particular min-term determined at a lowest one of the levels.

In one particular embodiment, the system further includes a plurality of wireless access points provided within the location, with each of the wireless interface devices being in electronic communication with the central computer system through at least one of the wireless access points. The wireless access points may, at least in part, implement a wireless network according to the IEEE 802.11 set of standards. Also, the wireless interface devices may be adapted to wirelessly communicate with the transponder at a first frequency and with at least one of the wireless access points at a second frequency that is different than the first frequency.

Alternatively, each of the wireless interface devices may be in electronic communication with the central computer system through a wired connection, such as over existing power lines.

In one particular embodiment, the location includes a plurality of sub-locations, wherein each of the sub locations includes a set of the wireless interface devices. In each sub-location, a particular one of the set of the wireless interface devices included in the sub-location is structured to determine a sub-min-term for the transponder, the sub-min-term for each sub-location representing a plurality of Boolean variable values, wherein each of the Boolean variable values is associated with a respective one of the wireless interface devices of the set of the wireless interface devices included in the sub-location and indicates whether the one of the wireless interface devices has at least received a wireless signal from the transponder. The central computer system receives one or more of the sub-min-terms and determines the estimate of the current position based on the one or more of the sub-min-terms. The central computer system may receive all of the sub-min-terms and determine the estimate of the current position based on all of the sub-min-terms, may receive less than all of the sub-min-terms and determine the estimate of the current position based on less than all of the sub-min-terms.

In another embodiment, a method of estimating the current position of a transponder associated with an asset within a location is provided that includes providing a plurality of wireless interface devices within the location, each of the wireless interface devices having a selectively adjustable wireless receiving sensitivity, setting the wireless receiving sensitivity of each of the wireless interface devices to a starting level, determining the number of the wireless interface devices that have received a current wireless signal from the transponder, and reducing the wireless receiving sensitivity of each of the wireless interface devices and re-determining the number of the wireless interface devices that have received a then current wireless signal from the transponder one or more times until the number as re-determined is the same as the number just prior to being re-determined. When the number as re-determined is the same as the number just prior to being re-determined, the method includes identifying the particular one or more of the wireless interface devices that have received the then current wireless signal from the transponder, and determining an estimate of the current position based on the identified particular one or more of the wireless interface devices.

In yet another embodiment, a method of estimating the current position of a transponder associated with an asset within a location is provided that includes providing a plurality of wireless interface devices within the location, each of the wireless interface devices having a selectively adjustable wireless receiving sensitivity, setting the wireless receiving sensitivity of each of the wireless interface devices to a starting level, and determining a min-term for the transponder, the min-term representing a plurality of Boolean variable values, each of the Boolean variable values being associated with a respective one of the wireless interface devices and indicating whether the one of the wireless interface devices has received a current wireless signal from the transponder. The method also includes reducing the wireless receiving sensitivity of each of the wireless interface devices and re-determining the min-term for the transponder based on a then current signal from the transponder one or more times until a number of the Boolean variable values in the min-term having a first value does not change. When the number of the Boolean variable values in the min-term having a first value does not change, an estimate of the current position is determined based on the then current min-term or on the min-term determined immediately prior to the min-term determined just before the then current min-term.

In still another embodiment, a method of estimating the current position of a transponder associated with an asset within a location is provided that includes providing a plurality of wireless interface devices within the location, each of the wireless interface devices having a selectively adjustable wireless receiving sensitivity, setting the wireless receiving sensitivity of each of the wireless interface devices to a starting level, and determining the number of the wireless interface devices that have received a first wireless signal from the transponder. If the number of the wireless interface devices that have received the first wireless signal from the transponder is less than or equal to a predetermined amount, the method includes identifying the particular one or more of the wireless interface devices that have received the first wireless signal from the transponder and determining an estimate of the current position based on the identified particular one or more of the wireless interface devices that have received the first wireless signal from the transponder. If the number of the wireless interface devices that have received the first wireless signal from the transponder is not less than or equal to the predetermined amount, the method includes reducing the wireless receiving sensitivity of each of the wireless interface devices and determining a number of the wireless interface devices that have received a then current wireless signal from the transponder one or more times until the number of the wireless interface devices that have received the then current wireless signal from the transponder is less than or equal to the predetermined amount and thereafter identifying the particular one or more of the wireless interface devices that have received the then current wireless signal from the transponder and determining an estimate of the current position based on the identified particular one or more of the wireless interface devices that have received the then current wireless signal from the transponder.

In another alternative embodiment, a method of estimating the current position of a transponder associated with an asset within a location is provided that includes providing a plurality of wireless interface devices within the location, each of the wireless interface devices having a selectively adjustable wireless receiving sensitivity, setting the wireless receiving sensitivity of each of the wireless interface devices to a starting level, determining a first min-term for the transponder, the first min-term representing a plurality of Boolean variable values, each of the Boolean variable values being associated with a respective one of the wireless interface devices and indicating whether the one of the wireless interface devices has received a first wireless signal from the transponder, and determining the number of the wireless interface devices that have received the first wireless signal from the transponder based on the first min-term. If the number of the wireless interface devices that have received the first wireless signal from the transponder is less than or equal to a predetermined amount, the method includes determining an estimate of the current position based on the first min-term. If the number of the wireless interface devices that have received the first wireless signal from the transponder is not less than or equal to the predetermined amount, the method includes reducing the wireless receiving sensitivity of each of the wireless interface devices and determining a then current min-term for the transponder based on a then current signal from the transponder one or more times until it is determined that the number of the wireless interface devices that have received the then current signal from the transponder is less than or equal to a predetermined amount, and thereafter determining an estimate of the current position based on the then current min-term or on the min-term determined immediately prior to the min-term determined just before the then current min-term.

In another embodiment, an interface device for communicating with both an RF emitting device and a computer system located remotely from the interface device is provided. The interface device includes a processing unit, a wireless communications apparatus operatively coupled to the processing unit, the wireless communications apparatus enabling wireless communications with the RF emitting device and the computer system, a power interface structured to be coupled to AC power lines for providing primary AC power to the interface device from the AC power lines, and an energy storage device for providing back-up power to the interface device when the primary AC power from the AC power lines is not available. The processing unit is programmed to cause the interface device to communicate with the computer system wirelessly using the wireless communications apparatus when the interface device is receiving the primary AC power from the AC power lines, and the processing unit is programmed to cause the interface device to communicate with the computer system over the AC power lines when the primary AC power from the AC power lines is not available. Also, a communication system that includes an RF emitting device, a computer system, and an interface device as just described that is located remotely from the computer system.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DESCRIPTION OF THE PREFERRED EMBODIMENTS

Figure 1:
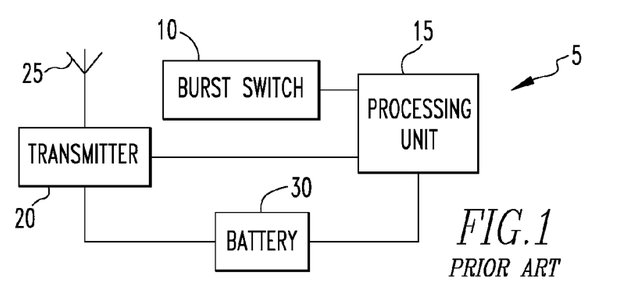
FIGS. 1-3 and 5-7 are block diagrams of various prior art active RF transponder embodiments that may be employed in the system of the present invention.

The present invention provides systems and methods for locating and tracking assets within a location in real time using wireless transponders that are associated with the assets. FIG. 1 is a block diagram of one embodiment of a prior art RF transponder 5 described in the '873 publication identified elsewhere herein. The RF transponder 5 is one exemplary type of wireless transponder that may be employed in the real time asset locating and tracking system and method embodiments of the present invention that are described in detail herein. The RF transponder 5 includes a burst switch 10, which is described in more detail in connection with FIG. 2. The burst switch 10 is in electronic communication with a processing unit 15, which may be, without limitation, a microprocessor, a microcontroller, or some other type of processor device. The processing unit 15 may further be another type of electronic device, such as a CMOS device or any other electronic circuit element provided on, for example, a semiconductor substrate or printed circuit board (PCB), which performs a particular function or functions. The processing unit 15 is capable of being placed into an inactive, sleep state where the current drawn by it is at a minimum. In addition, the processing unit 15 may be woken up, i.e., moved from the inactive, sleep state to an active state, upon receipt of an external input signal as in FIG. 4. An RF transmitter 20 is in electronic communication with the processing unit 15. The RF transmitter 20 may be a separate transmitter component, or may be part of a transceiver component that is capable of both transmitting and receiving RF signals. The RF transmitter 20 is, in response to commands received from the processing unit 15, able to transmit RF signals through an antenna 25 connected thereto. Like the processing unit 15, the RF transmitter 20 is capable of being placed into an inactive, sleep state where the current drawn by it is at a minimum, and can be woken up by receipt of an external input signal provided by the processing unit 15. The RF transponder 5 also includes a battery 30 which provides the power required for the operation of the processing unit 15 and the transmitter 20. The battery 30 may alternatively be replaced by another power source, such as, without limitation, a fuel cell or a super capacitor.

Figure 2:
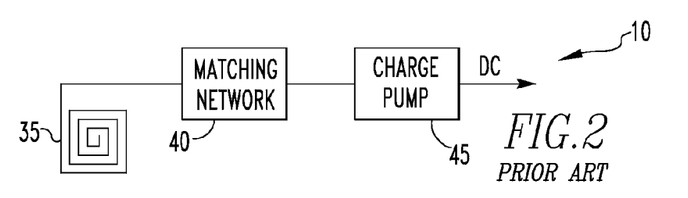

FIG. 2 is a schematic diagram of the burst switch 10. The burst switch 10 includes an antenna 35, which, in the embodiment shown in FIG. 2, is a square spiral antenna. The antenna 35 is electrically connected to a matching network 40, which in turn is electrically connected to a voltage boosting and rectifying circuit preferably in the form of a charge pump 45. Charge pumps are well known in the art. Basically, one stage of a charge pump increases the effective potential of an AC input voltage and stores the resulting increased DC voltage on an output capacitor. The voltage could also be stored using a rechargeable battery. Successive stages of a charge pump, if present, will essentially increase the voltage from the previous stage resulting in an increased output voltage. The matching network 40 matches the input impedance of the charge pump 45 to the impedance of the antenna 35 for optimal performance of the antenna 35 and optimal charge pump 45 output voltage. In one particular embodiment, the matching network 40 is an LC tank circuit formed by, for example, the inherent distributed inductance and inherent distributed capacitance of the conducing elements of the antenna 35. The antenna 35 is tuned to receive RF signals having a particular frequency, frequencies or range of frequencies. The RF signals that are received by the antenna 35 are provided, in the form of an AC signal, to the charge pump 45 through the matching network 40. The charge pump 45 essentially amplifies and rectifies the received AC energy signal and outputs the resulting DC signal. These operations are performed without requiring the consumption of power from the battery 30 or any other power source within or connected (physically) to the RF transponder 5.

Referring again to FIG. 1, in operation, the RF transponder 5 is deployed in a state wherein the processing unit 15 and the transmitter 20 are in the inactive, sleep state. As such, the draw on the battery 30 will be at a minimum. When it is desired to "wake-up" the RF transponder 5, an RF signal of an appropriate frequency is transmitted to the RF transponder 5 by, for example, an RFID reader or other suitable device (such as the interface devices described elsewhere herein). The RF signal is received by the burst switch 10, and as described above, the RF signal is used to produce a DC signal. The DC signal that is produced is provided to the sleep input (pin) of the processing unit 15, which causes the processing unit 15 to move from the inactive, sleep state to its active state. In the active state, the processing unit 15 is able to perform any action that is required, such as waking up the RF transmitter 20 and causing it to transmit a signal that contains information such as an identifier for the RF transponder 5. When finished (or after some predetermined period of time), the processing unit 15 can return to an inactive, sleep state until subsequently woken up as described herein. As will be appreciated, the burst switch 10 as shown in FIG. 2 is designed to produce a DC signal of an appropriate level for input into the sleep input of the processing unit 15 through appropriate selection of the parameters of the antenna 25, the matching network 40 and/or the charge pump 45.

A shortcoming of the particular RF transponder 5 shown in FIG. 1 is that spurious RF energy (noise) received by the burst switch 10 could inadvertently cause the processing unit 15 to move to the active state, thereby consuming power when not needed. Also, if a number of similar RF transponders 5 (i.e., similar meaning the antenna 35 of each is tuned to the same frequency or frequency range) are deployed together, an RF signal that is transmitted by a reader will activate all of the RF transponders 5, even if they are not all currently of interest to the reader. In other words, there is no way to selectively activate one or more of them without also activating the remaining ones of them.

Figure 3:
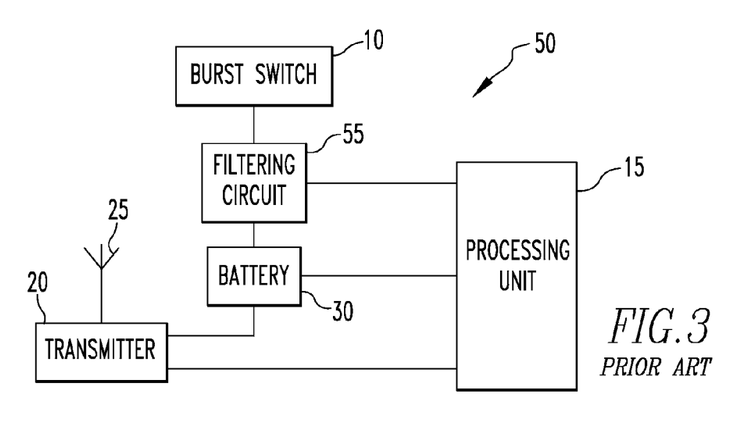

FIG. 3 is a block diagram of an alternative prior art RF transponder 50 described in the '873 publication that addresses the shortcomings of the simple RF transponder 5 shown in FIG. 1. The RF transponder 50 may also be employed in the real time asset locating and tracking system and method embodiments of the present invention that are described in detail herein as an alternative to the RF transponder 5. As seen in FIG. 3, the RF transponder 50 is similar to the RF transponder 5 in that it includes a burst switch 10, a processing unit 15, an RF transmitter 20 connected to an antenna 25, and a battery 30. However, the RF transponder 50 further includes a low power filtering circuit 55. Specifically, as shown in FIG. 3, the DC output of the burst switch 10 is provided to the filtering circuit 55, and the output of the filtering circuit 55 is provided to the sleep input of the processing unit 15. The function of the filtering circuit 55 is twofold. First, the filtering circuit 55 prevents spurious RF energy (noise) from inadvertently causing the processing unit 15 to move from an inactive, sleep state to an active state. Second, the filtering circuit 55 provides a mechanism by which the particular RF transponder 50 in which the filtering circuit 55 is included can be selectively woken up, i.e., have its processing unit 15 selectively moved to an active state. The filtering circuit 55 performs these functions by causing a wake-up signal to be sent to the sleep input of the processing unit 15 only if a particular sequence or pattern (i.e., format) of RF signals is received by the burst switch 10.

Figure 4:
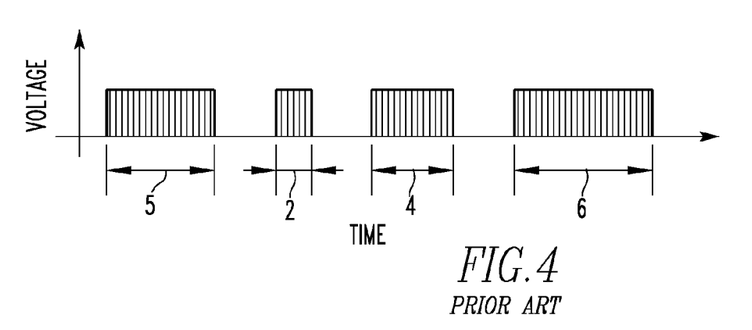
FIG. 4 is a schematic illustration of a code that may be required to awaken the prior art transponder shown in FIG. 3.

In the preferred embodiment, the filtering circuit 55 is a state machine that will generate a wake-up signal only if a particular pre-set "code" is received from the burst switch 10, wherein the code is a particular sequence of a certain number of voltage "bursts" (i.e., voltage signals of a certain (although possibly varying) length or duration; in this case, the bursts are DC signals, but bursts as used herein may also refer to RF signals of a certain (although possibly varying) length or duration) from the burst switch 10 each having a particular length expressed as a multiple of some pre-set unit of time, such as 1 millisecond. FIG. 4 shows an example of a 4 element code that may be required to be output by the burst switch 10 and received by the filtering circuit 55 in order for the filtering circuit 55 to generate a wake-up signal for waking up the processing unit 15. In the example of FIG. 4, the code that must be received is a 4 burst code consisting of a burst of length 5 (e.g., 5 milliseconds), followed by a burst of length 2 (e.g., 2 milliseconds), followed by a burst of length 4 (e.g., 4 milliseconds), followed by a burst of length 6 (e.g., 6 milliseconds). In effect, the code is 5 2 4 6. As will be appreciated, the code scheme of FIG. 4 is meant to be exemplary only, and any number of bursts of any possible length and any base length unit of time may be used for a particular code.

In operation, the filtering circuit 55 will count (possibly on a dedicated counter) the number of separate bursts received and the length of each burst (the length of each burst may be stored in a register or any suitable memory). When the count reaches the pre-set number, e.g., 4, the registers (or memory) are checked for the proper code (i.e., has the proper sequence of burst lengths been received?). If the code is determined to be correct, the filtering circuit 55 will generate a wake-up signal for the processing unit 15. As will be appreciated, the required code may be generated by an RFID reader or other suitable device (such as the interface devices described elsewhere herein) by generating a sequence of an appropriate number of RF bursts wherein each RF burst is of a particular time duration. As described in connection with FIG. 2, each such RF burst will result in a corresponding DC voltage (DC burst) being output by the burst switch 10 having a length equal to the length of the RF burst. Thus, in order to generate the 5 2 4 6 code described above, an RF reader or other suitable device must output an RF burst having a length of 5 (e.g., 5 milliseconds), followed by an RF burst having a length of 2 (e.g., 2 milliseconds), followed by an RF burst having a length of 4 (e.g., 4 milliseconds), followed by an RF burst having a length of 6 (e.g., 6 milliseconds).

The filtering circuit 55 thus solves the noise problem by requiring a particular sequence of RF bursts before the processing unit 15 is awakened. The filtering circuit 55 also allows a number of RF transponders 50 to be deployed and selectively and independently awakened. In particular, each transponder 50 (or set of transponders 50 to be grouped and awakened together) that is deployed at a location can be provided with a unique code. In order for an RFID reader to wake up a particular transponder 50 (or set of grouped transponders 50), the RFID reader will need to generate the appropriate RF bursts. As an alternative, any particular RF transponder 50 may be provided with more than one code that would enable it to be awakened, wherein one code may be used to awaken the RF transponder 50 individually, and another code may be used to awaken it as part of a group of particular transponders 50.

As seen in FIG. 3, the filtering circuit 55 is connected to the battery 30 for power purposes. Preferably, the filtering circuit 55 is a device or component that may enter a low power sleep state. The filtering device 55 will remain in a sleep state until a burst is received, at which time it will move to an active state (the burst is the wake-up signal), count the burst, measure its duration, and return to sleep until the next burst is received. As a result, minimal power is consumed by the filtering circuit 55. As will be appreciated, the filtering circuit 55 thus may be any low power electronic device that can be turned on for a short period of time, increment a counter, measure a burst length, and then go back to sleep.

Figure 5:
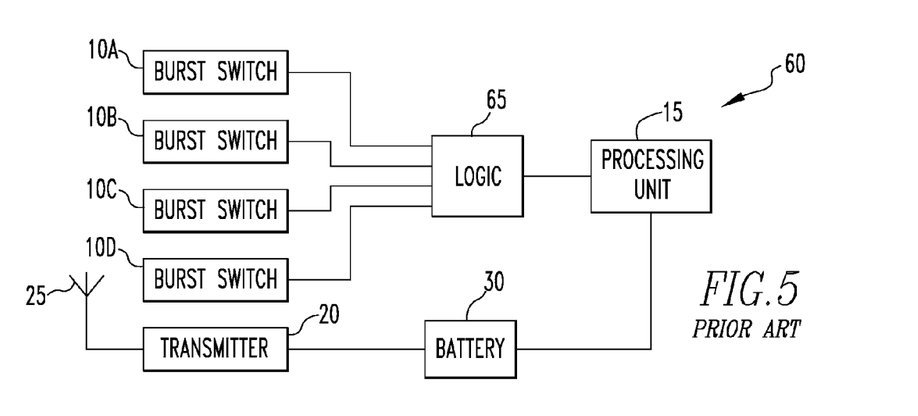

FIG. 5 is a block diagram of an alternative prior art RF transponder 60 described in the '873 publication that includes an alternate arrangement for addressing the shortcomings of the simple RF transponder 5 shown in FIG. 1, i.e., the noise problem and the inability to discriminate among multiple transponders. The RF transponder 60 may also be employed in the real time asset locating and tracking system and method embodiments of the present invention that are described in detail herein as an alternative to the RF transponder 5. As seen in FIG. 5, the RF transponder 60 is similar to the RF transponder 5 in that it includes a processing unit 15, an RF transmitter 20 connected to an antenna 25, and a battery 30. However, the RF transponder 60 includes multiple burst switches 10A, 10B, 10C, and 10D wherein the antenna 35 of each burst switch 10A, 10B, 10C, 10D is tuned to a different frequency or range of frequencies (although only four burst switches 10 are shown, more or less than four may be employed to suit the particular needs of the application in question without departing from the scope of the present invention). In addition, as represented by passive logic combination 65, the burst switches 10A, 10B, 10C, 10D are topologically interconnected in a manner that implements a selected logical combination, such as an AND, an OR, or any other logic operation or combination of operations. It will be appreciated that each burst switch 10A, 10B, 10C, 10D will only output a DC signal if it receives an RF signal of the appropriate frequency (each referred to as a "burst switch frequency" for convenience). Thus, the passive logic combination 65 can be chosen to only provide a wake-up signal to the processing unit 15 if a particular combination of the burst switch frequencies is received. For example, the passive logic combination 65 could be implemented as an AND such that all of the burst switch frequencies must be received for a wake-up signal to be sent to the processing unit 15. Alternatively, the passive logic combination 65 could be implemented with a series of ANDs and ORs such that any two, or any three of the burst switch frequencies or a particular two or a particular three of the burst switch frequencies must be received for a wake-up signal to be sent to the processing unit 15.

Thus, because particular burst switch frequencies must be received to wake-up the processing unit 15, the arrangement shown in FIG. 5 prevents spurious RF energy (noise) from inadvertently causing the processing unit 15 to move from an inactive state to an active state. In addition, the arrangement shown in FIG. 5 may also be used to provide a mechanism by which the particular RF transponder 60 in which it is included can be selectively woken up, i.e., have its processing unit 15 selectively moved to an active state. Specifically, a number of transponders 60 may be deployed with different burst switch frequencies and/or different passive logic combinations 65 such that an RFID reader can generate appropriate RF signals to selectively wake-up certain ones of the RF transponders 60. For example, one RF transponder 60 could be deployed wherein all of the burst switch frequencies are required to wake it up, another RF transponder 60 could be deployed wherein a particular two of the burst switch frequencies are required to wake it up, another RF transponder 60 could be deployed wherein a different particular two of the burst switch frequencies are required to wake it up, another RF transponder 60 could be deployed wherein a particular three of the burst switch frequencies are required to wake it up, and so on.

In an alternative embodiment of the RF transponder 60, instead of providing the passive logic combination 65, the burst switches 10A, 10B, 10C, and 10D could be combined and biased with respect to one another such that the burst frequencies must be received in a particular pre-set order for a wake-up signal to be sent to the processing unit 15. In such an arrangement, each burst switch 10 following a first one of the burst switches 10 would require the preceding burst switch 10 to be energized before it would be capable of outputting a DC signal. In this sense, the arrangement of burst switches 10A, 10B, 10C, 10D functions like an electronic combinational lock, and as such is able to prevent noise from inadvertently waking up the processing unit 15 and is able to allow the RF transponder 60 in which it is implemented to be selectively woken-up.

Figure 6:
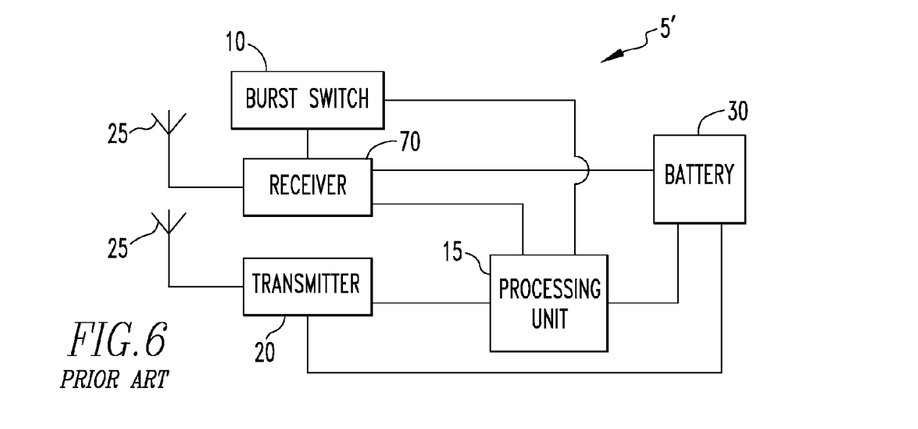
Figure 7:
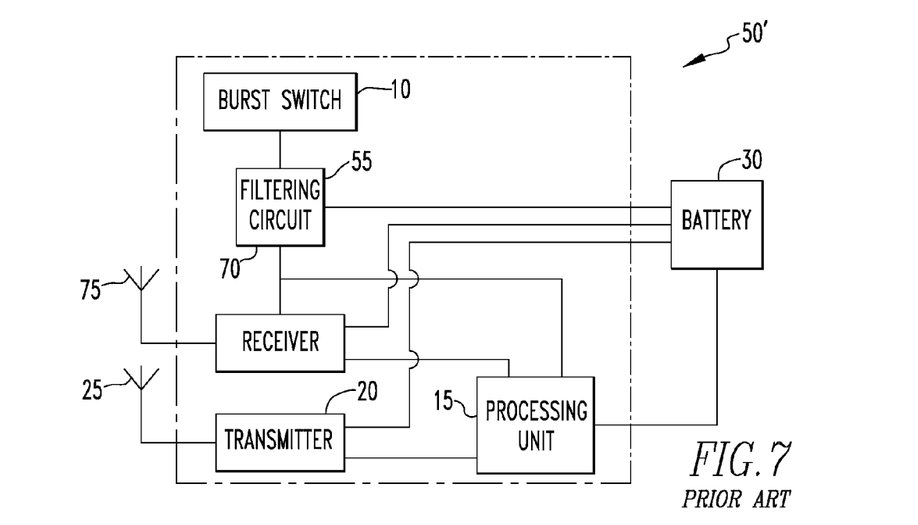

FIG. 6 is a block diagram of yet another alternative prior art RF transponder 5' described in the '873 publication that is similar to RF transponder 5 shown in FIG. 1 except that it further includes an RF receiver 70 connected to an antenna 75. The RF transponder 5' may also be employed in the real time asset locating and tracking system and method embodiments of the present invention that are described in detail herein as an alternative to the RF transponder 5. The RF receiver 70 may be caused to move from an inactive, sleep state to an active state by the burst switch 10 in order to allow for further communication with the processing unit 15 via the RF receiver 70. The communications may be according to an established standard, such as the ISO 18000 Part 7 standard. Similarly, FIG. 7 is a block diagram of a further alternative prior art RF transponder 50' described in the '873 publication that is similar to RF transponder 50 shown in FIG. 3 except that it also further includes an RF receiver 70 connected to an antenna 75. The RF transponder 50' may also be employed in the real time asset locating and tracking system and method embodiments of the present invention that are described in detail herein as an alternative to the RF transponder 5. The RF receiver 70 in this embodiment may be caused to move from an inactive, sleep state to an active state by the burst switch 10 and filtering circuit 55 in the manner described elsewhere herein in order to allow for further communication with the processing unit 15 of the RF transponder 50' via the RF receiver 70. Again, the communications may be according to an established standard, such as the ISO 18000 Part 7 standard.

Figure 8:
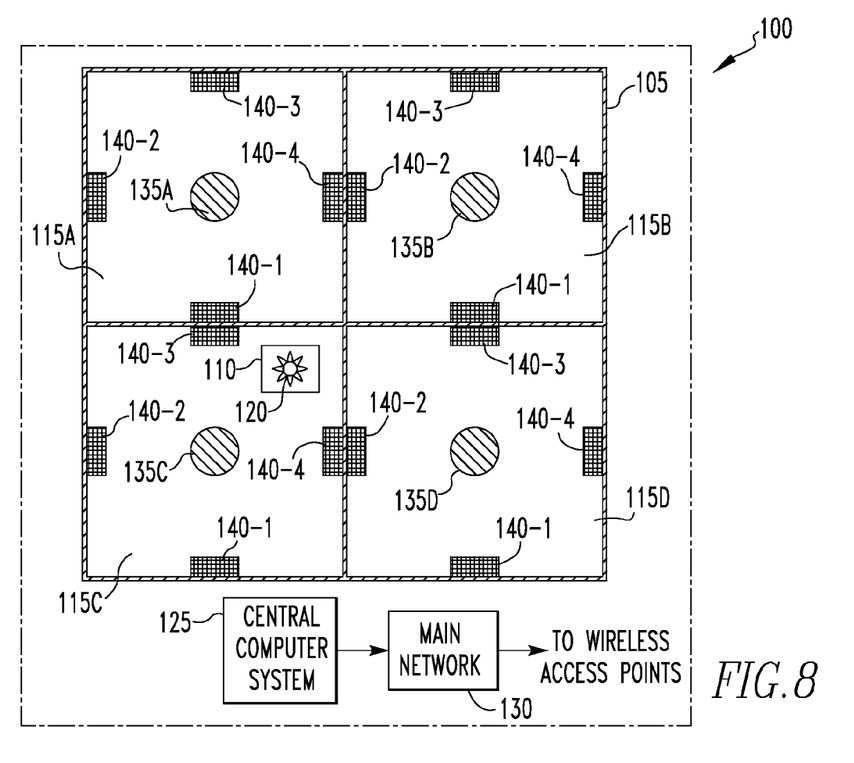
FIG. 8 is a schematic diagram of an asset locating and tracking system according to one embodiment of the present invention.

FIG. 8 is a schematic diagram of an asset locating and tracking system 100 according to one embodiment of the present invention. The system 100 enables centralized, remote location tracking of a number of assets 110 within a particular location or environment 105 having a number of sub-locations 115, such as individual rooms, therein. In the example embodiment shown in FIG. 8, the particular location or environment 105 includes four sub-locations 115, labeled 115A, 115B, 115C and 115D. The particular location or environment 105 may be, for example and without limitation, a building. The term "building" as used herein shall refer to any structure including, without limitation, a warehouse, a hospital, an office building, or even a vehicle. For ease of description purposes only, a single asset 110 is shown in FIG. 8, although it will be appreciated that multiple assets 110 are contemplated.

The assets 110 being tracked may be any type of physical item, including both movable items and items that are permanently or temporarily fixed in place, and both inanimate and animate (humans and animals) objects. For example, in a hospital application, the assets may be various types of medial equipment, such as, without limitation, a crash cart, an EKG machine, a wheel chair, a gurney, an oxygen dispenser, a staff member, or a patient. As another example, the assets may be first responder personnel, such as firefighters or police officers, and the particular location or environment 105 may be a building experiencing an emergency situation such as a fire or a crime (e.g., a school where a shooting has occurred). Each of the assets 110 has a transponder 120 physically associated therewith, preferably by physically attaching the transponder 120 to the asset 110. Each transponder 120 is preferably any of the RF transponder embodiments described herein, such as the RF transponder 5, the RF transponder 5', the RF transponder 50, the RF transponder 50' or the RF transponder 60. The RF transponders 120 may also be an RF transponder as described U.S. Pat. No. 7,375,637 entitled "Method and Device for Reducing Power Consumption of Active RFID Tags" and owned by the assignee hereof, the disclosure of which is incorporated herein by reference. The RF transponders 120 may also be any other type of known or later developed device that is able to communicate with the interface devices 140 described elsewhere herein, and thus may not require a burst switch as described in connection with FIGS. 1 through 7. Further, each RF transponder 120 is preferably provided with an identifier that uniquely identifies it.

The system 100 further includes a central computer system 125 that is connected to a main network 130. The central computer system 125 may include, without limitation, a PC or another suitable computing device or devices that is provided with one or more software applications for implementing the system described herein. As seen in FIG. 8, the system 100 also includes a number of wireless access points 135. In the embodiment shown in FIG. 8, each sub-location 115A, 115B, 115C and 115D is provided with a respective wireless access point 135A, 135B, 135C, 135D. Each of the wireless access points 135 is in electronic communication, preferably wired communication, with the main network 130. Each wireless access point 135 is capable of receiving a signal from the main network 130, and thus from the central computer system 125, and wirelessly transmitting that signal within a particular defined area. In addition, each wireless access point 135 is capable of receiving wireless signals from within its particular defined area and transmitting those signals to the main network 130, and thus to the central computer system 125. The main network 130 and wireless access points 135 thus form a wireless network for the location 105. In the preferred embodiment, the wireless network for the location 105 is a WiFi network that is implemented according to the IEEE 802.11 family of standards. Alternatively, the wireless network for the location 105 that includes the wireless access points 135 could be established according to any other suitable standard or protocol, including, without limitation, the X10 standard which allows communication over the existing 115 VAC power lines. Furthermore, the X10 protocol could be implemented as a back-up network to be used in the event that the main network, e.g., an IEEE 802.11 network, fails.

The system 100 also further includes a number of interface devices 140 that are positioned throughout the location 105 within the sub-locations 115. Each interface device 140 is preferably either plugged into a wall socket within one of the sub-locations 115 or otherwise permanently or semi-permanently mounted within one of the sub-locations 115. In addition, each interface device 140 is located within the range of at least one of the wireless access points 135. In the example embodiment shown in FIG. 8, each sub-location 115A, 115B, 115C, and 115D includes four interface devices 140, labeled 140-1, 140-2, 140-3 and 140-4 for ease of identification.

As described in greater detail below, each interface device 140 is capable of receiving wireless (e.g., RF) signals from and transmitting wireless (e.g., RF) signals to the associated wireless access point 135 according to the appropriate protocol. In addition, each interface device 140 is capable of transmitting wireless (e.g., RF) signals to the transponders 120 (again, for convenience and not to be limiting, only one transponder 120 is shown) that are in proximity thereto and receiving wireless (e.g., RF) signals from those transponders 120. Thus, the interfaces devices 140 are wireless interface devices. For example, based upon control signals received from the central computer system 125 through the main network 130 and the appropriate wireless access point 135, each interface device 140 is capable of transmitting one or more wireless (e.g., RF) signals which may be received by the burst switch 10 of any transponder 120 within range thereof (in the manner or manners described elsewhere herein in connection with the embodiments of the RF transponder 5, the RF transponder 5', the RF transponder 50, the RF transponder 50' and the RF transponder 60) for purposes of causing the processing unit 15 of the transponder 120 to move to an active state. In addition, as described in detail elsewhere herein, each interface device 140 is capable of receiving response signals from one or more transponders 120 after they have been awakened based on the location of the transponder 120 (in particular based on the proximity of the transponder to the interface device 140) and the RF receiving sensitivity of the interface device 140. In this respect, the interface devices 140 function like RFID readers or interrogators. Further, each interface device 140 may be provided with an identifier that uniquely identifies it.

Figure 9:
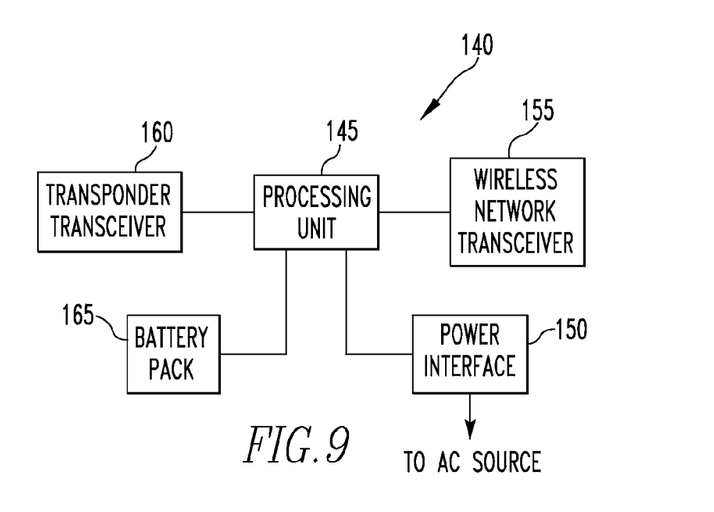
FIG. 9 is a block diagram of an embodiment of an interface device forming a part of the system shown in FIG. 8.

FIG. 9 is a block diagram of one particular embodiment of the interface device 140 shown in FIG. 8. The interface device 140 includes a processing unit 145, which may include, without limitation, a microprocessor, a microcontroller, or some other type of processor device, and may further include a memory for storing one or more programs for controlling the operation of the interface device 140. The processing unit 145 is electrically connected to a power interface 150 which provides power thereto. The power interface 150 is adapted to be coupled to an AC source, such as a wall outlet, in order to receive an AC voltage. The power interface 150 converts the AC voltage into a DC signal that is suitable for use by the processing unit 145. Alternatively, power may be provided through a battery pack 165 (preferably rechargeable), or some other suitable energy storage device such as a fuel cell or a supercapacitor, that is provided as part of each interface device 140. Such a battery pack 165 may also be used in combination with the power interface 150 and the AC source to act as a back-up in the event that the AC source becomes unavailable (which is often the case in emergency situations). A wireless network transceiver 155 is provided in electronic communication with the processing unit 145. The wireless network transceiver 155 is, under the programmed control of the processing unit 145, adapted to receive wireless (e.g., RF) signals from and transmit wireless (e.g., RF) signals to one or more wireless access point 135 according to the appropriate protocol, such an 802.11 protocol, using an appropriate frequency, such as 2.45 GHz. In addition, a transponder transceiver 160 is provided in electronic communication with the processing unit 145 for enabling the processing unit 145 to transmit appropriate wireless (e.g., RF) signals through the transponder transceiver 160 for possible receipt by one or more of the transponders 120 and to receive appropriate wireless response signals therefrom. A separate transmitter and receiver may be used in place of the transponder transceiver 160 to together function as a wireless communications device. Thus, as will be appreciated, each interface device 140 functions as an interface between the two communications systems, i.e., the wireless network implemented by the wireless access points 135 and the wireless communications links to the transponders 120. In an alternative embodiment, a separate (dedicated) transmitter may be provided in each interface device 140 for sending the required signals for possible receipt by the burst switch 10 of the transponders 120, and the transponder transceiver 160 may be used for other communication with the transponders 120. In the preferred embodiment, the wireless communications between the interface devices 140 and the wireless access points 135 will be at a frequency (preferably an ISM frequency) that is different than the wireless communications that take place between the interface devices 140 and the transponders 120 as described herein. For example, the wireless communications between the interface devices 140 and the wireless access points 135 may take place at frequencies specified in the IEEE 802.11 protocol (e.g., 2.45 GHz), and the wireless communications that take place between the interface devices 140 and the transponders 120 may take place at 433 MHz. In addition, both the wireless network transceiver 155 and the transponder transceiver 160 are preferably adapted to wirelessly communicate using multiple different frequencies and/or multiple different protocols.

Furthermore, the interface device 140 and the power interface 150 thereof are structured to enable the interface device 140 to selectively communicate with the main network 130 and/or the central computer system 125 over the existing power lines using the X10 or some other suitable standard or protocol. As described elsewhere herein, the interface device 140 is adapted to (the processing unit 145 is programmed to) communicate with the main network 130 and/or the central computer system 125 over the existing power lines in situations where AC power is not available (due to an intentional shut off or a failure). In such situations, power will be provided to the interface device 140 through the battery pack 165.

In addition, according to one particular embodiment that is described elsewhere herein, the wireless (e.g., RF) receiving sensitivity of the transponder transceiver 160 is able to be selectively adjusted by the processing unit 145 based on either a manual (preferably local) input into the interface device 140 or on a signal received from the central computer system 125 through the wireless network transceiver 155. As a result, the minimum power level of a wireless signal that may actually be received by each interface device 140 in the system 100 can be selectively adjusted. As will be appreciated, this minimum level will, based on the transmitting power of the transponders 120, determine how close a particular transponder 120 must be to the interface device 140 in order for a signal from the transponder 120 to be received by the interface device 140. The significance of this feature will be described in greater detail elsewhere herein.

According to an aspect of the present invention, the system 100 is able to determine a best estimate of the position of particular transponders 120 within the location 105 using a methodology where each interface device 140 in the system 100 maintains a YES/NO Boolean variable for each transponder 120 of the system 100 representing whether or not the particular interface 140 is receiving a wireless (e.g., RF) transmission from the transponder 120 (e.g., YES means that the particular interface 140 is currently receiving a wireless (e.g., RF) transmission from the transponder 120 in question and NO means that the particular interface 140 is not currently receiving a wireless (e.g., RF) transmission from the transponder 120 in question). Preferably, the Boolean variables are maintained as binary values where a 1 represents a YES and a 0 represents a NO. In addition, the current Boolean variable values stored by each interface device 140 are able to be transmitted to the central computer system 125 though the wireless access points 135 and the main network 130. In one particular embodiment, the YES or NO status of the Boolean variable for each transponder 120 of the system 100 also depends on whether the interface device 140 recognizes as valid the signal received from the particular transponder 120. In one specific, non limiting embodiment, each particular transponder 120 may be adapted to transmit, along with its identifier, a particular, predetermined data frame, wherein an interface device 140 will recognize as valid the signal received from the transponder 120 and store a YES Boolean variable for the transponder 120 only if the proper predetermined data frame is received. Other methods for determining validity of the received signal are also possible.

As described in greater detail below, the Boolean variable values received from each interface device 140 for each transponder 120 are used by the central computer system 125 to determine the best estimate of the position of each transponder 120 (and thus the associated asset 110) within the location 105. In particular, the complete set of Boolean variable values maintained by the interface devices 140 (in a particular preset sequence) for each transponder 120 (and thus for each asset 110) in the system 120 is referred to herein in the present embodiment as a "min-term" (i.e., the min-term for each transponder 120 will be a series of 1s and 0s representing the current Boolean values for that transponder 120). As will be appreciated, for a predetermined number n of interface devices 140, there will be $2^n$ possible min-term values for each transponder 120 in the system 100. Before any actual asset tracking is done by the system 100, each possible min-term value (i.e., each series of 1s and 0s) is associated with a particular estimated position within the location 105 in a look-up table, so that when a current min-term for a particular transponder 120 is determined, the estimated position can be determined in real time by consulting the look-up table. In other words, the position relative to each of the possible min-term values can be pre-determined (pre-calculated) offline and stored in a table so as to make the real time determination of position based on actual determined min-term values a simple table look-up.

By way of example, consider the exemplary embodiment of the system 100 shown in FIG. 8. That system has four sub-locations 115A, 115B, 115C and 115D with a total of sixteen interface devices 140 (each sub-location 115 has interface devices 140-1, 140-2, 140-3 and 140-4). In addition, each sub-location 115A, 115B, 115C and 115D has an associated wireless access point 135 (labeled 135A, 135B, 135C and 135D). In the exemplary system 100 shown in FIG. 8, for each transponder 120 (and thus each asset 110) there are sixteen Boolean variables (one for each of the sixteen interface devices 140), all of which will have a value of either TRUE (1) or FALSE (0), and thus the min-term for each transponder 120 will have $2^{16}$ (65,536) possible values. For instance, depending on the receiving sensitivity of each interface device 140 and the transmitting power of each transponder 120 when interrogated, the min-term of the transponder 120 in the position shown in FIG. 8 may be 1000000000110100, where the Boolean variable values for the transponder 120 in each of the interface devices 140 are as follows: A140-1=1, A140-2=0, A140-3=0, A140-4=0, B140-1=0, B140-2=0, B140-3=0, B140-4=0, C140-1=0, C140-2=0, C140-3=1, C140-4=1, D140-1=0, D140-2=1, D140-3=0, D140-4=0. Alternatively, with different settings for the receiving sensitivity of each interface device 140 and/or the transmitting power of each transponder 120, the min-term of the transponder 120 in the position shown in FIG. 8 may be 0000000000110000, where the Boolean variable values in each of the interface devices 140 are as follows: A140-1=0, A140-2=0, A140-3=0, A140-4=0, B140-1=0, B140-2=0, B140-3=0, B140-4=0, C140-1=0, C140-2=0, C140-3=1, C140-4=1, D140-1=0, D140-2=0, D140-3=0, D140-4=0. As described elsewhere herein, the Boolean variable values will be transmitted to the central computer system 125, and the central computer system 125 will then build the actual min-term based thereon and consult the stored look-up table to determine the estimated position that has been previously associated with the min-term that was generated.

In one particular embodiment, the central computer system 125 stores one or more files, such as, without limitation, one or more files in a database, that include for each asset 110/transponder 120 a unique identifier for the asset 110/transponder 120 and a history of position estimates for the asset 110/transponder 120. The unique identifier may be, without limitation, a serial number, and is stored in a memory of each transponder 120 (the memory may be part of the processing unit 15 thereof or be separate from but in electronic communication with the processing unit 15 thereof). In this embodiment, the Boolean variable values stored by each interface device 140 and ultimately the resulting min-term and the position estimate determined by the central computer system 125 may be updated as follows. First, the central computer system 125 periodically or on demand generates an asset interrogation signal. The asset interrogation signal is sent to the main network 130 and then to each wireless access point 135. Each wireless access point 135 then wirelessly transmits the asset interrogation signal according to the appropriate protocol, such as the IEEE 802.11 protocol. The wirelessly transmitted asset interrogation signal is received by each interface device 140 that is within the range of each wireless access point 135. In response to receipt of the asset interrogation signal, each interface device 140 generates a second RF interrogation signal having a frequency that will be picked up by the antenna 35 of the burst switch 10 of each transponder 120 that is within range. As described elsewhere herein, in the preferred embodiment, when the burst switch 10 of any transponder 120 receives the second RF interrogation signal, a DC signal is generated that causes the processing unit 15 of the transponder 120 to move to an active state. Each such processing unit 15 is adapted to then cause an RF interrogation response signal of an appropriate frequency (e.g., 433 MHz) to be generated by the associated transmitter 20 in the transponder 120. Each RF interrogation response signal includes the unique identifier stored by the transponder 120 that generated the RF interrogation response signal (and may also include the predetermined data frame as described elsewhere herein). In order to avoid collisions, the RF interrogation response signals are, in one embodiment, transmitted one at a time in a sequential manner, such as according to an order determined by the unique identifier of each RFID tag 110. Other collision avoidance mechanisms are also possible.

Based on the receiving sensitivity of each of the interface devices 140 and the relative position of each of the transponders 120 within the location 105, each of the generated RF interrogation response signals will be received by none, to some to all of the interface devices 140. Each interface device 140 will then, based on the received signals (and the included identifiers), if any, be able to update its Boolean variable values for each of the transponders 120 in the system 100. Each interface device 140 will then generate a Boolean update signal that includes the current Boolean variable values for each of the transponders 120 and transmit that signal to the central computer system 125 through the wireless access points 135 and the main network 130. As an alternative, in order to reduce data traffic, the Boolean update signal will only include data for Boolean variables that are a 1. In this embodiment, the central computer system 125 will assume that any Boolean variable values that are not received in the Boolean update signals are a 0.

Upon receipt of the Boolean update signals, the central computer system 125 is able to determine the current min-term for each asset 110/transponder 120 in the system 100, and based thereon update the estimated position of each asset 110/transponder 120 in its records. In particular, after each min-term is determined, the look-up table will be consulted to determine the estimated position of each asset 110/transponder 120 within the location 105, and that estimated position will be added to the position history of the asset 110/transponder 120. Preferably, the central computer system 125 will maintain a position history including a predetermined number of previous position estimates for each asset 110/transponder 120 so that the movement of the asset 110/transponder 120 can be tracked over time in addition to providing its current position.

As described elsewhere herein, one of the shortcomings of the RF transponders 5 and 5' is that they could be inadvertently awakened by spurious RF noise. This could present a problem for the embodiment of the system 100 just described (and in the alternative embodiment(s) described below) as the transponders 120, if implemented as RF transponders 5 or 5', could be caused to inadvertently send RF interrogation response signals in response to noise. This problem may be addressed by providing a system 100 in which each of the transponders 120 is an RF transponder 50 (or, alternatively, an RF transponder 50') that will be awakened by the same burst code, e.g., 5 2 4 6. In this particular embodiment, operation of the system 100 is similar to that described above (or below in the case of alternative embodiments). However, in this particular embodiment, the second RF interrogation signal that is generated by each interface device 140 upon receipt of the asset interrogation signal from a wireless access point 135 will be an RF signal consisting of the appropriate RF bursts sufficient to cause the burst switch 10 of each transponder 120 within range to create the required burst code for the filtering circuit 55 of the transponder 120. As described elsewhere herein, that code, when received by the filtering circuit 55, will cause a wake-up signal to be generated for the associated processing unit 15, which, in response, will wake-up and generate the appropriate RF interrogation response signal. Thus, in this embodiment, the adverse affects of noise are minimized.

As described elsewhere herein, a further shortcoming of the RF transponders 5 and 5' is that there is no mechanism for discriminating among a number of them when deployed, i.e., there is no way to selectively cause only certain ones of them to respond. As result, an embodiment of the system 100 that utilizes the RF transponder 5 or 5' will be required to interrogate all of the transponders 120 each time a location is desired, as opposed to only interrogating selected transponders 120 and thus selected assets 110. As will be appreciated, while this will still gather the necessary asset location information, it will cause battery power for certain of the transponders 120 to be unnecessarily consumed.

Thus, according to a further alternative embodiment, a system 100 is provided in which selected ones and/or selected groups of the transponders 120 may be interrogated. In this particular embodiment, each of the transponders 120 is an RF transponder 50 (or, alternatively, an RF transponder 50') that may be awakened by a burst code that is unique to that transponder 120. For example, each individual transponder 120 may be assigned a unique 4 element burst code as described elsewhere herein (such as 5 2 4 6) (a 4 element burst code is merely an example, and it should be understood that the burst code may have more or less than 4 elements). As a result, each of those transponders 120 may be selectively, individually interrogated by the central computer system 125 in the manner described elsewhere herein (in both the main (described above) and alternative embodiments (described below)) using the appropriate burst code. The interface devices 140 will then update their Boolean variable values as appropriate based upon the received RF interrogation response signal or signals as described elsewhere herein. In addition, one or more of the transponders 120 may also be adapted to be awakened by a particular burst code that is common to a selected group of transponders 120. In other words, certain groups of transponders 120 (and thus certain groups of assets 110) may also be assigned a second burst code that may be used to awaken each of the transponders 120 in the group. For example, all assets 110 of type one (e.g., crash carts, or assets on floor one of a building) may be assigned the burst code 4 2 4 3, all assets 110 of type two (e.g., EKG machines, or assets on floor two of a building) may be assigned the burst code 3 1 4 2, etc. As a result, the location of all assets 110 in a particular group, such as crash carts, can be readily determined, if desired, by the system 100 using a single burst code.

As will be appreciated, in the embodiment of the system 100 just described, each asset interrogation signal that is sent by the central computer system 125 will need to include information that identifies the particular burst code that is to be used for that interrogation. The interface devices 140 will then use that information to generate the appropriate second RF interrogation signals that are transmitted. When multiple assets 110 or specified groups thereof are to be interrogated in this manner, the central computer system 125 will preferably generate and transmit the appropriate asset interrogation signals in a sequential fashion in order to avoid signal collision problems (the responses will also be sent in a similar, corresponding sequential fashion). Thus, according to an aspect of the present invention, the central computer system 125 maintains a table or similar record that links each asset 110 with the code or codes that may be used to awaken the transponder 120 associated with the asset 110. That same table or other record will also preferably separately list specified asset groups (e.g., crash cards, EKG machines, assets in a particular wing, etc.) and the common code that is assigned to each group so that such common codes may be readily accessed.

In yet a further alternative embodiment of the system 100, each of the transponders 120 is an RF transponder 60 that, as described elsewhere herein, is able to be awakened by a particular combination or sequence of burst switch frequencies. This embodiment is similar to the embodiment of the system 100 described above that employs the RF transponders 50 or 50', except that the burst codes are replaced by specified combinations or sequences of burst switch frequencies. The basic operation of the system 100 otherwise remains essentially the same.

As will be appreciated, the number of 1s (YESs) in the min-term generated for any transponder 120 will depend on the sensitivity of the transponder transceiver 160 of each of the interface devices 140. A large number of 1s resulting from a particular receiving sensitivity level could be problematic as it may make the position estimate too difficult (i.e., not very accurate). However, as noted elsewhere herein, the receiving sensitivity of the transponder transceiver 160 of each of the interface devices 140 may be selectively adjusted (e.g., by certain predetermined steps from a starting level to an ending level). Such adjustment (i.e., reducing sensitivity), either simultaneously or according to various schemes, makes it possible to reduce the number of 1s (YESs) in the min-terms for the various transponders 120, thereby allowing a more accurate estimate of the position of the transponders 120 (and thus the associated assets 110) based on the determined min-terms. As also noted elsewhere herein, such a reduction in sensitivity can be effected by the central computing system 125 simultaneously by generating and transmitting a broadcast message to all of the interface devices 140 through the main network 130 and wireless access points 135 (or over existing power lines for the alternative embodiment(s) described below), thus making the refinement of position estimates extremely fast and allowing for sufficient position estimates of numerous transponders 120 to be determined in real time so as to be able to actually plot and track the trajectories/paths of the transponders 120 as they move within the location 105.

As a further alternative, each transponder 120 may be adapted to continuously transmit a signal that includes its unique identifier and, optionally, the predetermined data frame. In such a case, each interface device 140 will then, based on the received signals (and the included identifiers), if any, be able to update its Boolean variable values for each of the transponders 120 in the system 100 as needed, such as in response to a specific request from the central computer system 125 or periodically. This embodiment may be particularly useful in situations where the assets 110 are people such as first responders.

In a further alternative embodiment, communication through the wireless access points 135 is not employed. Instead, communications are performed over wired connections, preferably over the existing power lines using the X10 standard. More specifically, the central computer system 125 (or another remote computer system) periodically or on demand generates an asset interrogation signal that is transmitted to each interface device 140 over the wired connection described above. In response to receipt of the asset interrogation signal, each interface device 140 generates a second RF interrogation signal having a frequency that will be picked up by each transponder 120 that is within range. Each such transponder 120 is adapted to then cause an RF interrogation response signal to be generated that includes the unique identifier stored by the transponder 120 (each RF interrogation response signal may also include the predetermined data frame as described elsewhere herein). Based on the receiving sensitivity of each of the interface devices 140 and the relative position of each of the transponders 120 within the location 105, each of the generated RF interrogation response signals will be received by none, to some to all of the interface devices 140. Each interface device 140 will then, based on the received signals (and the included identifiers), if any, be able to update its Boolean variable values for each of the transponders 120 in the system 100. Alternatively, as noted above, each transponder 120 may be adapted to continuously transmit a signal that includes its unique identifier and, optionally, the predetermined data frame. In such a case, the each interface device 140 will then, based on the received signals (and the included identifiers), if any, be able to update its Boolean variable values for each of the transponders 120 in the system 100 as needed.

After each of the interface devices 140 wirelessly receives a signal from one or more of the transponders 120 and updates its Boolean variable values for each of the transponders 120, that information is not then transmitted to the central computer system 125 through the wireless access points 135 so that the min-terms for the transponders 120 can be constructed by the central computer system 125. Instead, in this embodiment, after each of the interface devices 140 updates its Boolean variable values, a sub-min-term is determined for each of the sub-locations 115A, 115B, 115C and 115D by one of the interface devices 140-1, 140-2, 140-3 and 140-4 in that sub-location 115. More specifically, in each sub-location 115, a leader interface device 140 of the interface devices 140-1, 140-2, 140-3 and 140-4 is chosen by a suitable ad hoc manner. For example, and without limitation, the interface devices 140-1, 140-2, 140-3 and 140-4 wirelessly (or by wired connection, e.g., over existing power lines) communicate with one another and the leader is selected to be the interface device 140 that has the lowest identifier number. Once the leader is chosen, that interface device 140 wirelessly receives the updated Boolean variable values for each of the transponders 120 from the other interface devices 140 in the particular sub-location 115. The leader interface device 140 then generates a sub-min-term for each transponder 120 consisting the Boolean values for the transponder 120 received from each of the other interface devices 140. In the particular embodiment shown, each such sub-min-term will consist of 4 values (e.g., 1011). The sub-min-term for each transponder 120 is then transmitted by the leader interface device 140 to the central computer system 125 (or to another remote computer system) using a wired connection, preferably over the existing power lines using the X10 standard. Such a transmission mechanism, which does not employ the wireless access points 135, is advantageous in that it may be employed in situations where AC power (and thus wireless communication via the wireless access points 135) is not currently available. For example, AC power in a building is often cut off in an emergency situation (e.g., fire, hostage situation), and thus this embodiment may be used to track the position of first responders. When each sub-min-term (i.e., from each sub-location 115) for each transponder 120 is received by the central computer system 125 (or another remote computer system), the full min-term for each transponder 120 can then be constructed and used to determine a position for each asset 110/transponder 120 as described elsewhere herein.

Alternatively, rather than determining a sub-min-term for each transponder 120 for each sub-location 115 as just described, a sub-min-term can be determined for transponder 120 for only selected sub-locations 115 (e.g., only sub-location 115A) and transmitted to the central computer system 125 (or another remote computer system). The received sub-min-term or sub-min-terms can then be used to determine a position for each asset 110/transponder 120 (the sub-min-term or sub-min-terms are thus the "min-term" used for position determination in this embodiment). As will be appreciated, that position determination may not be as accurate as a position based on a full min-term constructed from sub-min-terms received form all of the sub-locations 115. For example, if the received sub-min-term for a particular transponder 120 is something like 1011, then a position within the particular sub-location 115 associated with the sub-min-term may be determined. However, if the received sub-min-term for the particular transponder 120 is 0000, then all that can be determined is that the particular transponder 120 is not located in the particular sub-location 115 associated with the sub-min-term.

Figure 10:
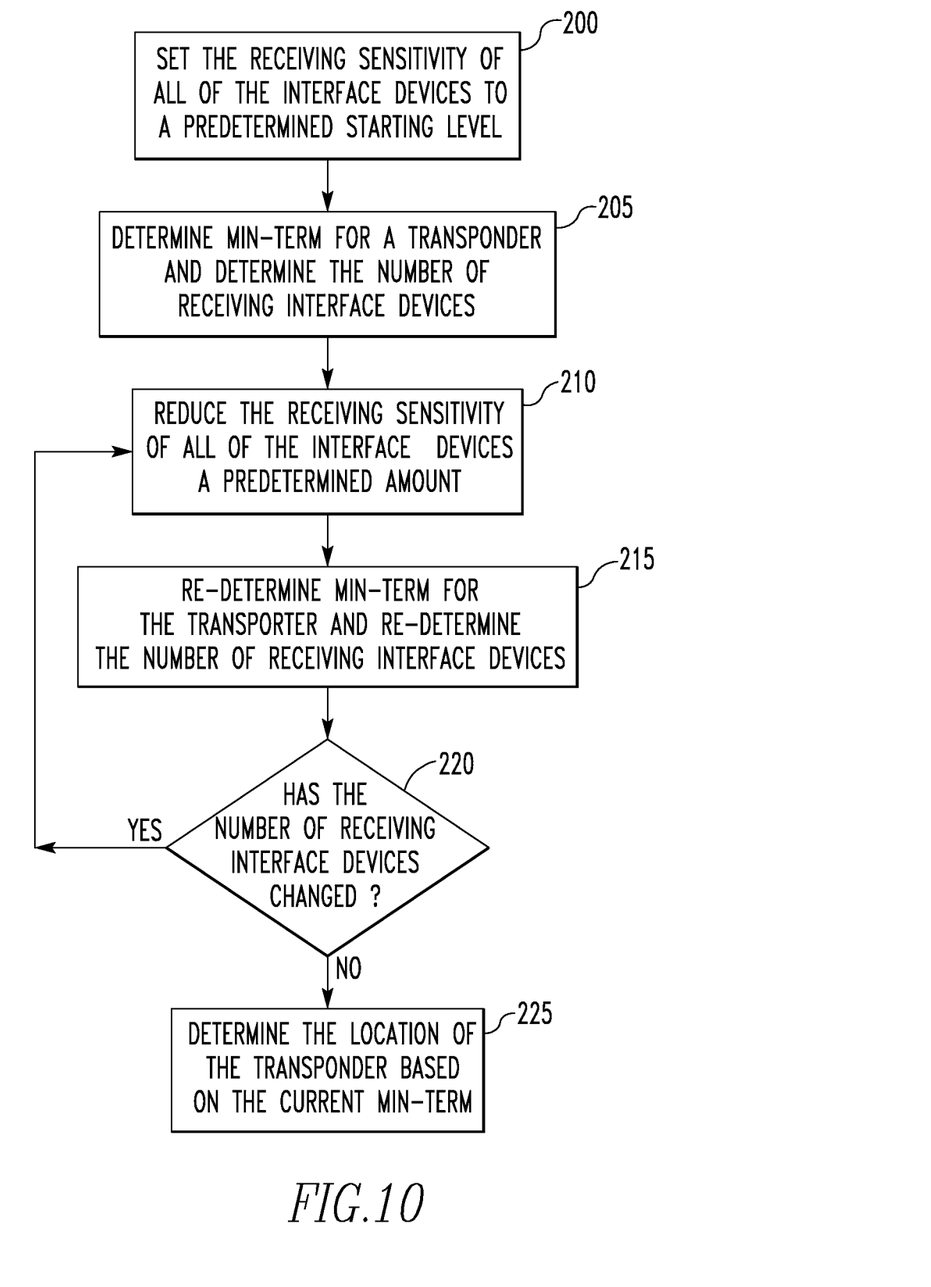
FIGS. 10 and 11 are flowcharts showing different methods for determining the location of an asset according to different embodiments of the invention.

FIG. 10 is a flowchart showing a method according to one particular embodiment in which position estimates for a transponder 120 (and thus an asset 110) may be refined by adjusting the receiving sensitivity of the interface devices 140. While the flowchart of FIG. 10 is described in connection with a single transponder 120, it will be appreciated that the same methodology may be applied to multiple transponders 120 simultaneously in order to refine the position estimate for each transponder 120. In addition, the method shown in FIG. 10 assumes that the receiving sensitivity of each of the interface devices 140 may be selectively adjusted in incremental steps from a starting level, such as, without limitation, a maximum level, to an ending level, such as, without limitation, a minimum level. For example, the receiving sensitivity of the interface devices 140 may range from 1.0 to 0.0 in steps of 0.1.

The method of FIG. 10 begins at step 200, wherein the receiving sensitivity of all of the interface devices 140 is set to a predetermined starting level, such as the maximum starting level. Next, at step 205, the min-term (or one or more sub-min-terms, if appropriate for the embodiment employed) for a particular transponder 120 is determined as described elsewhere herein. In addition, also at step 205, from the min-term (or one or more sub-min-terms, if appropriate for the embodiment employed), the number of receiving interface devices (i.e., the number of 1s) is determined. Then, at step 210, the receiving sensitivity of all of the interface devices 140 is reduced by a predetermined amount (for example, the receiving sensitivity for all of the interface devices 140 may be reduced by a step of 0.1). At step 215, the min-term (or one or more sub-min-terms, if appropriate for the embodiment employed) for the transponder 120 is re-determined. Also, from the re-determined min-term (or one or more sub-min-terms, if appropriate for the embodiment employed), the number of receiving interface devices 140 (i.e., the number of 1s in the min-term or sub-min-term)(s) is re-determined. Next, at step 220, a determination is made as to whether the number of receiving devices 140 has changed (i.e., whether the number of 1s in the min-term or sub-min-term(s) has changed). It is expected that if a change has occurred, the number will be reduced since the receiving sensitivity of the interface devices 140 has been reduced. If the answer at step 220 is yes, then the method returns to step 210 for further processing. If, however, the answer at step 220 is no, then, at step 225, the location estimate of the transponder 120 is determined based upon the current min-term (or set of sub-min-term(s) if appropriate for the embodiment employed) for the current sequence or on the min-term determined immediately prior to the min-term determined just before the then current min-term (or set of sub-min-term(s) if appropriate for the embodiment employed) as described elsewhere herein (i.e., from consulting the stored look-up table).

Figure 11:
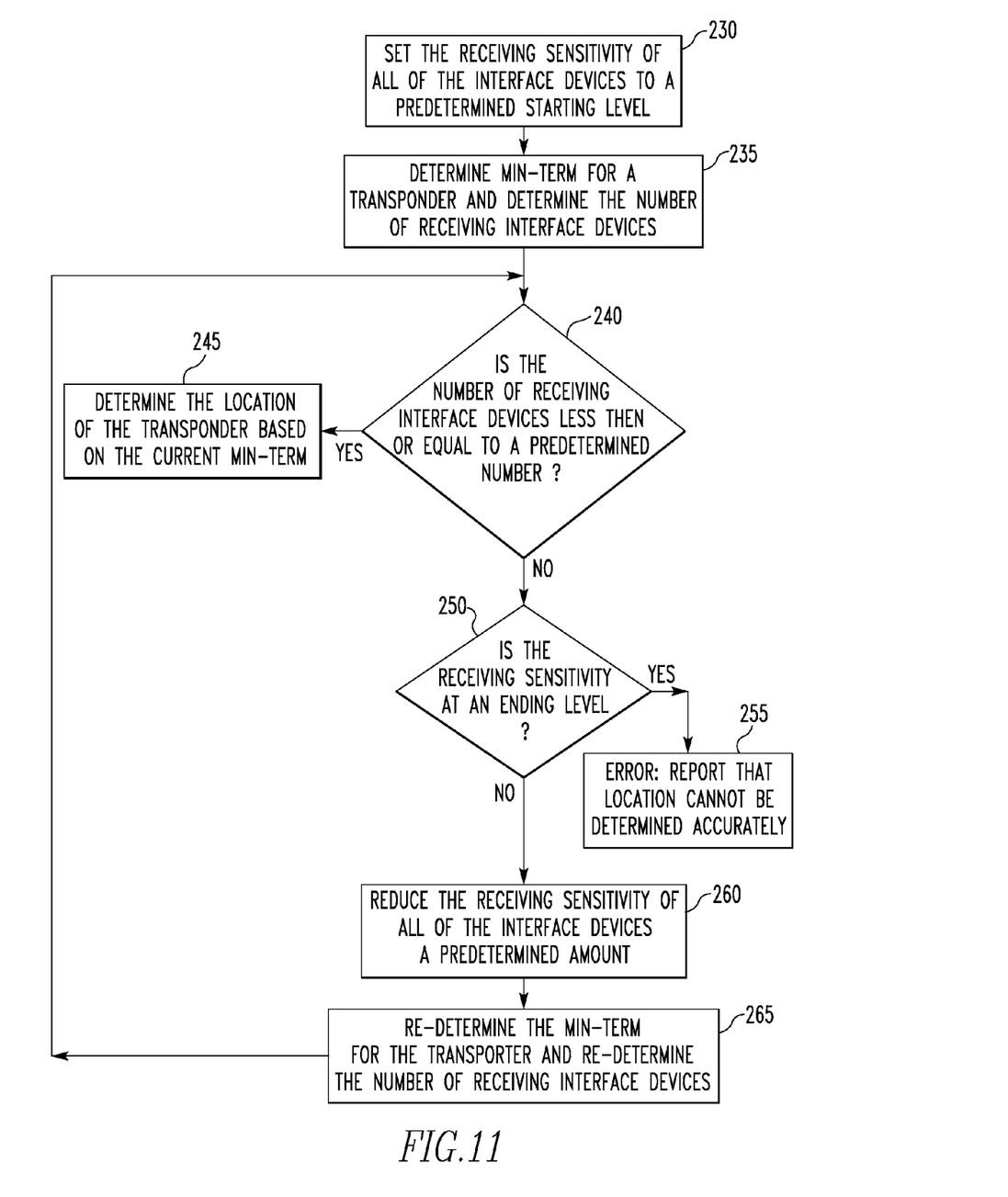

FIG. 11 is a flowchart of a method for refining position estimates for a transponder 120 by adjusting the receiving sensitivity of the interface devices 140 according to an alternative embodiment. The method of FIG. 11 begins at step 230, wherein the receiving sensitivity of all of the interface devices 140 is set to a predetermined starting level, such as a maximum level. Next, at step 235, the min-term (or one or more sub-min-terms, if appropriate for the embodiment employed) for a particular transponder 120 is determined as described elsewhere herein. In addition, from the determined min-term (or one or more sub-min-terms, if appropriate for the embodiment employed), the number of receiving interface devices 140 is determined. Then, at step 240, a determination is made as to whether the number of receiving interface devices 140 is less than or equal to a predetermined number. The predetermined number is established in advance and is set to some predetermined low value determined to be sufficiently indicative of an accurate position estimate. If the answer at step 240 is yes, then, at step 245, the location of the transponder 120 is determined based on the current min-term (or set of sub-min-term(s) if appropriate for the embodiment employed) for the current sequence as described elsewhere herein. If, however, the answer at step 240 is no, meaning that the number of receiving interface devices 140 is not less than or equal to the predetermined number, then, at step 250, a determination is made as to whether the receiving sensitivity is currently at an ending level, such as a minimum level for the interface devices 140. If the answer at step 250 is yes, meaning that the ending level has been reached without the number of receiving interface devices 140 being less than or equal to the predetermined number, then the method proceeds to step 255, wherein an error is reported that indicates that the location cannot be determined accurately. If, however, the answer at step 250 is no, then, at step 260, the receiving sensitivity of all of the interface devices 140 is reduced a predetermined amount. Next, at step 265, the min-term (or one or more sub-min-terms, if appropriate for the embodiment employed) for the transponder 120 in question is re-determined. Also at step 265, the number of receiving interface devices 140 is re-determined based upon the re-determined min-term (or one or more sub-min-terms, if appropriate for the embodiment employed). The method then returns to step 240 for further processing.

In a further alternative embodiment, the RF transmitting power of the transponder transceiver 160 is able to be selectively adjusted by the processing unit 145 based on either a manual (preferably local) input into the interface device 140 or on a signal received from the central computer system 125 through the wireless network transceiver 155. As a result, the power levels of the RF signals that are generated by each interface device 140 in the system 100 can be selectively adjusted. As will be appreciated, this power level will determine how close a particular transponder 120 must be to the interface device 140 in order for it to receive the signals generated by the interface devices 140, such as the second RF interrogation signals described elsewhere herein. As a result, like the selective adjustment of the receiving sensitivity, the selective adjustment of the transmitting power of the transponder transceivers 160 may be used to refine the position estimate of the transponders 120 (i.e., to reduce the number of 1s in the min-terms as described in connection with FIGS. 10 and 11).

While preferred embodiments of the invention have been described and illustrated above, it should be understood that these are exemplary of the invention and are not to be considered as limiting. For example, the majority of the description contained herein describes the burst switch 10 as awakening a processing unit 15. It should be appreciated that the burst switch 10 may be utilized to awaken any type of electronic device that is capable of entering an inactive, sleep state. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A system for estimating a current position of an asset within a location, comprising:
a transponder associated with said asset;
a plurality of wireless interface devices provided within said location; and
a central computer system in electronic communication with said wireless interface devices, said central computer system being adapted to: (i) identify a particular one or more of said wireless interface devices that have at least received a wireless signal from said transponder, and (ii) determine an estimate of said current position based on the identified particular one or more of said wireless interface devices, wherein said location includes a plurality of sub-locations, wherein each of said sub locations includes a set of said wireless interface devices, wherein in each said sub-location a particular one of the set of said wireless interface devices included in the sub-location is structured to determine a sub-min-term for said transponder, the sub-min-term for each sub-location representing a plurality of Boolean variable values, each of said Boolean variable values being associated with a respective one of the wireless interface devices of the set of said wireless interface devices included in the sub-location and indicating whether the one of said wireless interface devices has at least received a wireless signal from said transponder, wherein said central computer system receives one or more of the sub-min-terms and determines said estimate of said current position based on said one or more of the sub-min-terms.

2. The system according to claim 1, wherein said central computer system is further adapted to cause said wireless interface devices to generate a plurality of wireless interrogation signals, wherein said wireless signal from said transponder is generated in response to receipt of at least one of said wireless interrogation signals.

3. The system according to claim 1, wherein said wireless signal from said transponder is generated continuously.

4. The system according to claim 1, wherein said asset is either an animate object or an inanimate object.

5. The system according to claim 1, wherein each of said Boolean variable values is a 1 if the one of said wireless interface devices associated with the Boolean variable values has received the wireless signal from said transponder and otherwise is a 0.

6. The system according to claim 1, wherein each of said Boolean variable values is a 1 if the one of said wireless interface devices associated with the Boolean variable values has received and recognized as valid the wireless signal from said transponder and otherwise is a 0.

7. The system according to claim 1, further comprising a plurality of wireless access points provided within said location, each of said wireless interface devices being in electronic communication with said central computer system through at least one of said wireless access points.

8. The system according to claim 7, wherein the wireless access points at least in part implement a wireless network according to the IEEE 802.11 set of standards.

9. The system according to claim 8, wherein said wireless interface devices are adapted to wirelessly communicate with said transponder at a first frequency and with at least one of said wireless access points at a second frequency that is different than said first frequency.

10. The system according to claim 1, wherein each of said wireless interface devices is in electronic communication with said central computer system through a wired connection.

11. The system according to claim 1, wherein each of said wireless interface devices is in electronic communication with said central computer system over existing power lines.

12. The system according to claim 1, wherein said location is one or more buildings.

13. The system according to claim 1, wherein said transponder includes an electronic device having an inactive, sleep state and an active state, wherein said electronic device consumes power from a power source of said transponder in said active state, and wherein in response to receiving the at least one of said wireless interrogation signals, the transponder is structured to convert said the at least one of said wireless interrogation signals into at least one DC signal without consuming power from said power source or another power source within or connected to said transponder, and provide a wake-up signal to said electronic device, said wake-up signal causing said electronic device to move from said inactive, sleep state to said active state, wherein thereafter said wireless signal is generated by said transponder.

14. The system according to claim 1, wherein said central computer system receives all of the sub-min-terms and determines said estimate of said current position based on all of the sub-min-terms.

15. The system according to claim 1, wherein said central computer system receives less than all of the sub-min-terms and determines said estimate of said current position based on less than all of the sub-min-terms.

* * * * *

UNITED STATES PATENT AND TRADEMARK OFFICE
CERTIFICATE OF CORRECTION

PATENT NO. : 8,514,056 B2
APPLICATION NO. : 12/563441
DATED : August 20, 2013
INVENTOR(S) : Marlin H. Mickle et al.

Page 1 of 1

It is certified that error appears in the above-identified patent and that said Letters Patent is hereby corrected as shown below:

In the Drawings
Figure 11, Sheet 5 of 5, line 9, "LESS THEN" should read --LESS THAN--.
In the Specification
Column 5, line 12, "has" should read --have--.
Column 9, line 12, "conducing" should read --conducting--.
Column 13, line 22, "medial" should read --medical--.
Column 13, line 36, "described U.S. Pat." should read --described in U.S. Pat.--.
Column 14, line 30, "interfaces" should read --interface--.
Column 15, line 11, "such an" should read --such as the--.
Column 15, line 30, "communication" should read --communications--.
Column 16, line 24, "though" should read --through--.
Column 16, line 51, "be 2′″" should read --be $2^n$--.
Column 18, line 67, "wake-up" should read --wake up--.
Column 19, line 2, "adverse affects" should read --adverse effects--.
Column 19, line 8, "As result" should read --As a result--.
Column 20, line 30, "can be effected" should read --can be affected--.
Column 21, line 40, "consisting the" should read --consisting of the--.
Column 22, line 7, "form" should read --from--.
Column 22, line 52, "sub-min-term)(s)" should read --sub-min-term(s))--.

Signed and Sealed this
Eleventh Day of February, 2014

Michelle K. Lee
*Deputy Director of the United States Patent and Trademark Office*